(12) United States Patent
Abe

(10) Patent No.: US 6,466,367 B1
(45) Date of Patent: Oct. 15, 2002

(54) VIEWING OPTICAL INSTRUMENT

(75) Inventor: Tetsuya Abe, Hokkaido (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 114 days.

(21) Appl. No.: 09/653,335

(22) Filed: Aug. 31, 2000

(30) Foreign Application Priority Data

Sep. 1, 1999 (JP) ............................................. 11-247161

(51) Int. Cl.[7] .............................................. G02B 23/00
(52) U.S. Cl. ........................ 359/410; 359/388; 359/399; 359/425
(58) Field of Search .................................. 359/368, 392, 359/379–383, 399, 402, 407, 410, 425–426, 694, 696, 698; 250/201.3

(56) References Cited

U.S. PATENT DOCUMENTS

| | | | | |
|---|---|---|---|---|
| 1,899,192 A | * | 2/1933 | Gaertner | |
| 3,051,045 A | * | 8/1962 | Miuraca | |
| 5,148,200 A | * | 9/1992 | Takahashi et al. | |
| 5,276,555 A | * | 1/1994 | Sansbury | |
| 6,046,557 A | * | 4/2000 | Godo | |

FOREIGN PATENT DOCUMENTS

JP 2000-193874 * 7/2000

* cited by examiner

Primary Examiner—Thong Nguyen
(74) Attorney, Agent, or Firm—Greenblum & Bernstein, P.L.C.

(57) ABSTRACT

A viewing optical instrument includes a main barrel which supports an objective optical system, a movable member for focus adjustment which is supported by the main barrel to be movable along an optical axis of the objective optical system relative to the main barrel, a focusing mechanism which drives the movable member along the optical axis, a focus knob which actuates the focusing mechanism, an auxiliary unit provided separately from the viewing optical instrument including an auxiliary mechanism which is associated with the focusing mechanism when the auxiliary unit is connected to the viewing optical instrument, and a connecting device for detachably attaching the auxiliary unit to the viewing optical instrument.

15 Claims, 4 Drawing Sheets

VIEWING OPTICAL INSTRUMENT

BACKGROUND OF THE INVENTION

1. Field of the Invention

The present invention relates to a focusing device of a viewing optical instrument such as an astronomical telescope.

2. Description of the Related Art

A rack-and-pinion type focusing device is generally used as a focusing device for conventional viewing optical instruments such as astronomical telescopes. In rack-and-pinion type focusing devices, a pinion is driven by rotating a focus knob to move a focus member (generally a movable tube which is movable relative to the telescope main tube) provided thereon with a rack meshing with the pinion in the optical axis direction so as to bring a distant object into focus. In this conventional type focusing device, since the focusing operation is carried out by manually rotating the focus knob, the astronomical telescope cannot stay still due to hand movement. This deteriorates the accuracy of focusing.

If the pinion is driven by a motor, the accuracy of focusing improves because the astronomical telescope is prevented from suffering from such hand movement. However, among conventional astronomical telescopes, no astronomical telescope is known to be provided with a rack-and-pinion type focusing device whose focusing operation mode can be easily switched between a manual operation mode, in which the pinion is driven manually, and a motor operation mode in which the pinion is driven by motor. Moreover, in conventional astronomical telescopes, the concept of utilizing the positional information of the aforementioned focus member via a feedback function is not known in the art.

SUMMARY OF THE INVENTION

The primary object of the present invention is to provide a focusing device of a viewing optical instrument, wherein an auxiliary unit, provided independently from the body of the viewing optical instrument, can be connected to the body of the viewing optical instrument as needed. The auxiliary unit extends the capability of a manual focusing device of the viewing optical instrument, providing the viewing optical instrument with a motor-driven focusing function or a positional information feedback function.

To achieve the object mentioned above, according to an aspect of the present invention, a viewing optical instrument is provided, including a main barrel which supports an objective optical system; a movable member for focus adjustment which is supported by the main barrel to be movable along an optical axis of the objective optical system relative to the main barrel; a focusing mechanism which drives the movable member along the optical axis; a focus knob which actuates the focusing mechanism; an auxiliary unit provided separately from the viewing optical instrument including an auxiliary mechanism which is associated with the focusing mechanism when the auxiliary unit is connected to the viewing optical instrument; and a connecting device for detachably attaching the auxiliary unit to the viewing optical instrument.

When the auxiliary unit is connected to the viewing optical instrument, the auxiliary mechanism is coupled to the focusing mechanism via a route different from a route of which the focus knob is coupled to the focusing mechanism.

Preferably, the viewing optical instrument further includes a fixed housing fixed to the main barrel, and a first mount, formed on the fixed housing, on which the auxiliary unit is mounted, the first mount having a first through hole through which part of the focusing mechanism is exposed to the outside of the viewing optical instrument.

Preferably, a cover is further provided, which is connected to the first mount when the auxiliary unit is not connected to the first mount.

Preferably, the focusing mechanism includes a rack fixed to the movable member, the rack extending parallel to the optical axis, and a first pinion which is rotatably supported to mesh with the rack. The first pinion is driven when the focus knob is operated.

The viewing optical instrument can be an astronomical telescope.

Preferably, the movable member is a movable barrel fitted in the main barrel to be movable along the optical axis of the objective optical system relative to the main barrel.

In an embodiment, the driven device includes a counter which indicates the axial position of the movable member.

In an embodiment the auxiliary unit includes a second mount which is mounted onto the first mount when the auxiliary unit is connected to the viewing optical instrument. The second mount has a second through hole through which part of the auxiliary mechanism is exposed to the outside of the auxiliary unit, and the first through hole is aligned with and the second through hole when the auxiliary unit is mounted onto the first mount.

According to another aspect of the present invention, a viewing optical instrument includes a main tube and a drawtube which is drawn out of and inserted into the main tube to focus the telescope on an object which is to be viewed through the telescope; a focusing mechanism for driving the drawtube relative to the main tube; a focus knob which actuates the focusing mechanism; an auxiliary unit provided separately from the viewing optical instrument, the auxiliary unit including a auxiliary mechanism which is associated with the focusing mechanism when the auxiliary unit is connected to the telescope; and a connecting device for detachably attaching the auxiliary unit to the telescope.

The present disclosure relates to subject matter contained in Japanese Patent Application No.11-247161 (filed on Sep. 1, 1999) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
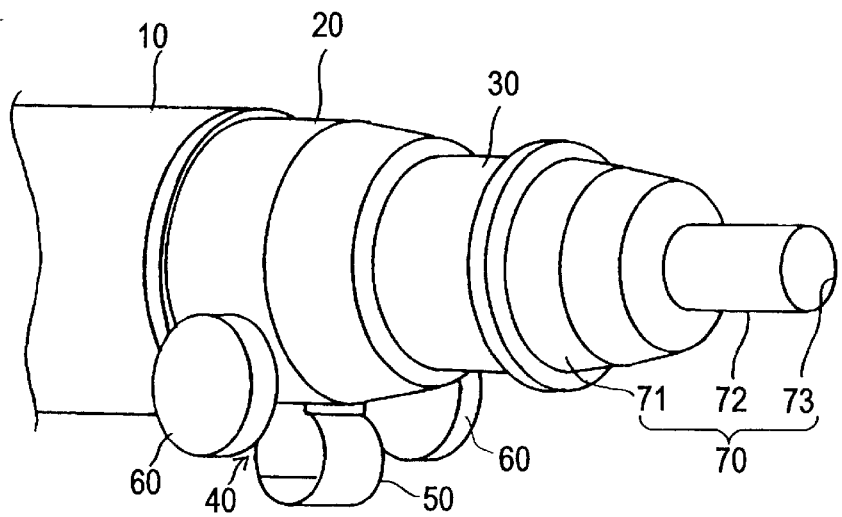
FIG. 1 is a fragmentary perspective view of an embodiment of an astronomical telescope provided with a focusing device according to the present invention.

FIG. 1 shows an embodiment of an astronomical telescope to which the present invention is applied. This astronomical telescope is provided with a telescope main barrel (fixed lens barrel/main tube) 10, a fixed housing 20, a movable barrel (drawtube/movable member) 30 and a focusing mechanism 40. An objective lens group (not shown) is supported by the telescope main barrel 10 therein. The fixed housing 20 is fixed at the rear end of the telescope main barrel 10. The movable barrel 30 is supported by the fixed housing 20 to be movable along an optical axis of the objective lens group (the horizontal direction as viewed in FIG. 1). The movable barrel 30 is driven along the optical axis by the focusing mechanism 40. The focusing mechanism 40 is further provided with left and right focus knobs 60 60 which are manually operated by the user.

The movable barrel 30 is provided at the rear end thereof with a mounting connector 70 to which a viewing instrument (optical instrument) such as an eyepiece adapter or a camera (e.g., an SLR camera, a lens-shutter camera or a CCD camera) is connected. In the illustrated embodiment of the astronomical telescope, the focal point of the objective lens group supported by the telescope main barrel 10 varies depending on the object distance. Thus the movable barrel 30 is moved along the optical axis of the objective lens group relative to the telescope main barrel 10 to focus the telescope on a distant object so that an in-focus distant object can be viewed through a viewing instrument which is connected to the mounting connector 70. Accordingly, the movable barrel 30 can be referred to as a movable member for focus adjustment which moves by an operation of bringing a distant object into focus. Although the illustrated embodiment of the astronomical telescope is a refracting telescope having the objective lens group (which includes an achromat) in the telescope main barrel 10, the astronomical telescope can be a reflecting telescope having a combination of mirrors in the telescope main barrel 10.

Figure 2:
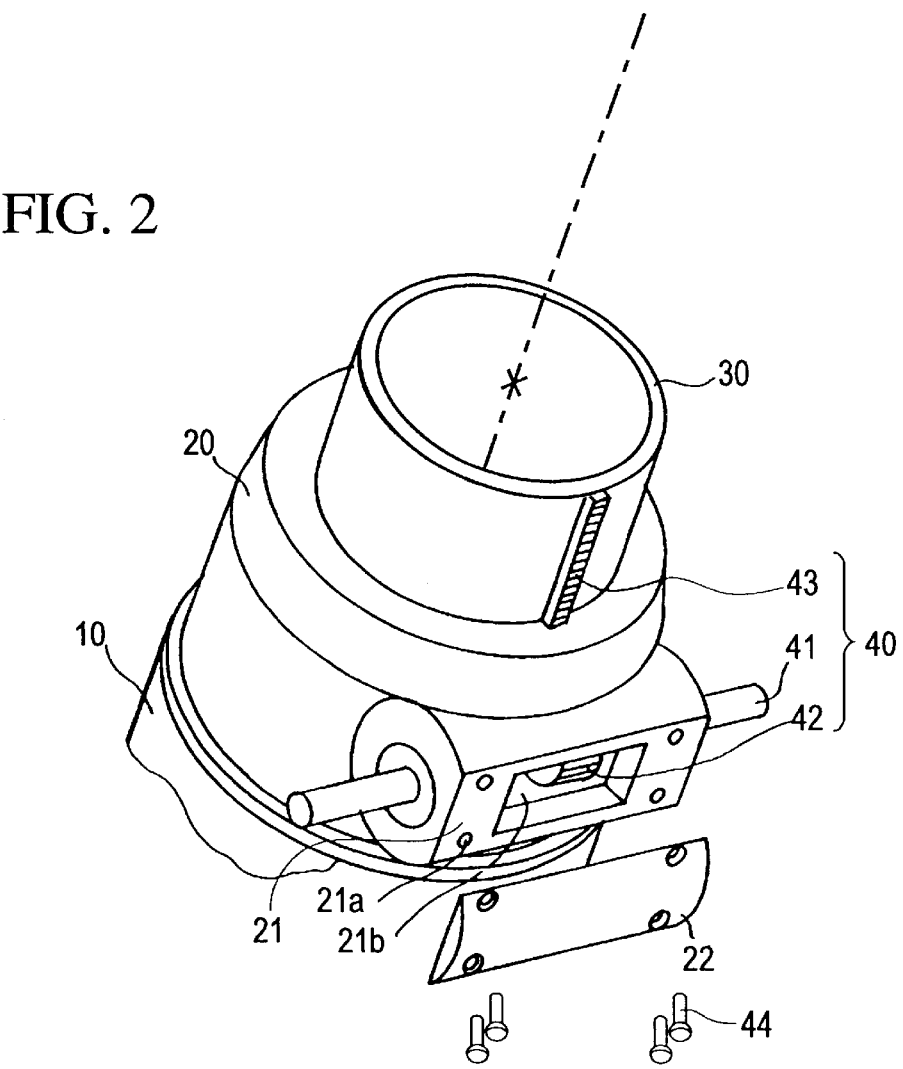
FIG. 2 is a fragmentary perspective view of the embodiment of the astronomical telescope shown in FIG. 1, showing a state where a mounting connector, a focus knob and a cover are removed.

FIG. 1 is a fragmentary perspective view of the astronomical telescope with an auxiliary drive unit (auxiliary unit) 50 being connected to the fixed housing 20. FIG. 2 shows a fragmentary perspective view, seen from below the fixed housing 20, of the astronomical telescope shown in FIG. 1. In FIG. 2, the auxiliary drive unit 50, the mounting connector 70 and the left and right focus knobs 60 are removed and thus not illustrated. The astronomical telescope is provided at the bottom of the fixed housing 20 with a shaft 41 which is supported by the fixed housing 20 to be rotatable about an axis extending in a direction perpendicular to the optical axis of the objective lens group, but not intersecting the optical axis of the objective lens group. The shaft 41 is provided at an approximate center thereof with the pinion 42 fixed to the shaft 41. The right and left focus knobs 60 are fixed at the opposite ends of the shaft 41, respectively. The movable barrel 30 is provided on an outer peripheral surface thereof with the rack 43 fixed to the movable barrel 30 and extending parallel to the optical axis of the objective lens group. The pinion 42 stays in mesh with the rack 43. The rack 43 and the pinion 42, which forms a rack-and-pinion mechanism, are fundamental elements of the focusing mechanism 40.

The fixed housing 20 is provided with a housing mount 21 on which the auxiliary drive unit 50 is mounted. A cover 22 is mounted on the housing mount 21 when the auxiliary drive unit 50 is not used. The housing mount 21 is provided with four threaded holes (auxiliary unit connecting device) 21a and a rectangular through hole 21b. FIG. 2 shows the housing mount 21 with the cover 22 being removed therefrom. The pinion 42 is exposed to the outside of the housing mount 21 through the through hole 21b. When the auxiliary drive unit 50 is not used, the cover 22 is fixed to the housing mount 21 by four set screws 44, screwed into the four corresponding threaded holes 21a.

The mounting connector 70, which is connected to the rear end of the movable barrel 30, includes an extension tube 71 whose front end is connected to the rear end of the movable barrel 30, and an adapter ring 72 whose front end is inserted into the extension tube 71. The adapter ring 72 is provided at the rear end thereof with an eyepiece socket 73 (viewing optical instrument insertion opening) 73. A viewing optical instrument such as an eyepiece or a camera can be connected to the eyepiece socket 73.

Rotation of either one of the left and right focus knobs 60 causes the pinion 42 to rotate via the shaft 41, so that the rack 43, which is in mesh with the pinion 42, moves in the optical axis direction. Consequently, the movable barrel 30, to which the rack 43 is fixed, moves in the optical axis direction relative to the fixed housing 20 therein. Due to this movement of the movable barrel 30 relative to the fixed housing 20, the space between the objective lens group and the viewing instrument connected to the mounting connector 70 varies, which makes it possible to focus the astronomical telescope on a distant object so that an in-focus distant object can be viewed through the viewing instrument. Accordingly, in a state where the cover 22 is fixed to the housing mount 21, i.e., where the auxiliary drive unit 50 is not mounted on the housing mount 21, a manual focusing operation, in which either one of the left and right focus knobs 60 is operated to focus the astronomical telescope on a distant object, can be performed in a manner similar to a conventional type astronomical telescope.

Figure 3:
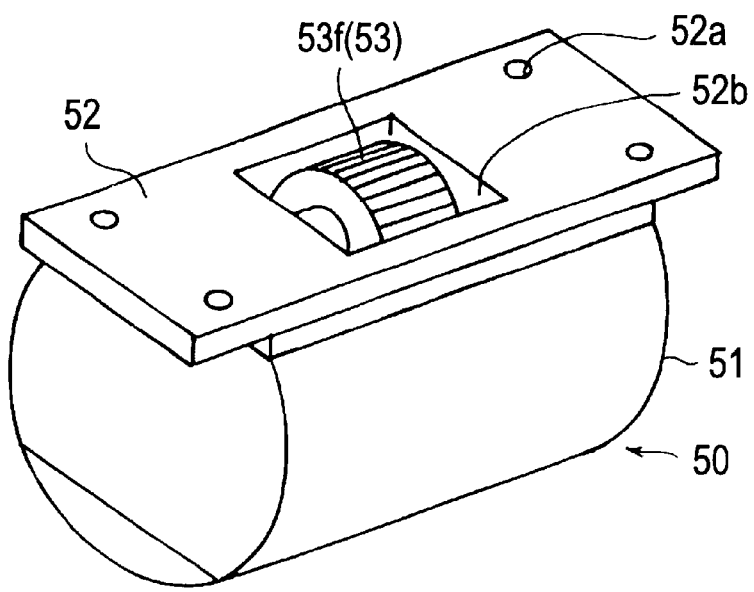
FIG. 3 is a perspective view of an auxiliary unit which is connectable to the astronomical telescope shown in FIG. 1.
Figure 4:
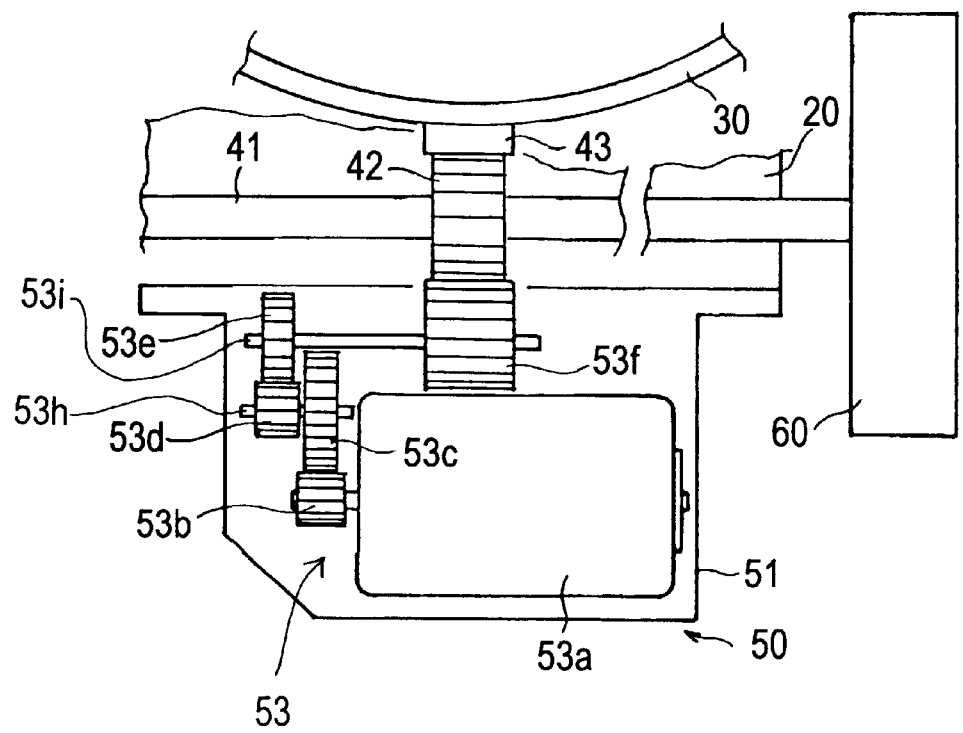
FIG. 4 is a cross sectional view, taken along a plane extending perpendicular to an optical axis of the astronomical telescope, of the auxiliary unit and part of a fixed housing of the astronomical telescope shown in FIG. 1, showing a state where the auxiliary unit is connected to the fixed housing.
Figure 5:
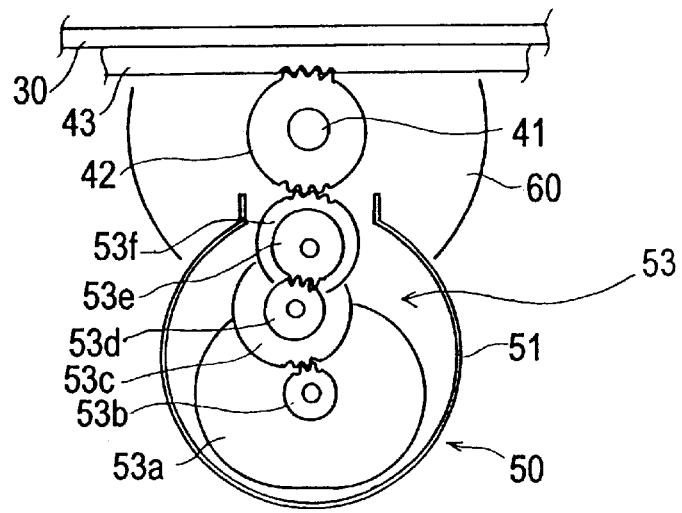
FIG. 5 is a cross sectional view, taken along a plane including the optical axis of the astronomical telescope, of the auxiliary unit and part of the fixed housing shown in FIG. 4.

FIGS. 3 through 5 shows an embodiment of the auxiliary drive unit 50. The auxiliary drive unit 50 includes a housing 51 and a drive mechanism (auxiliary mechanism) 53 disposed in the housing 51. The housing 51 is provided with a drive unit mount 52. The drive unit mount 52 is provided with four through holes (auxiliary unit connecting device) 52a and a rectangular through hole 52b which are formed to correspond to the four threaded holes 21a and the rectangular through hole 21b, respectively. The auxiliary drive unit 50 is mounted on the housing mount 21 by screwing the set screws 44 into the threaded holes 21a via the through holes 52a.

The drive mechanism 53 is provided with a motor 53a, a drive pinion 53b fixedly fitted on the drive shaft of the motor 53a, and a reduction gear train including first through fourth gears 53c, 53d, 53e and 53f. The drive pinion 53b is in mesh with the first gear 53c. The first gear 53c and the second gear 53d are fixedly fitted on a shaft 53h. The second gear 53d is in mesh with the third gear 53e. The third gear 53e and the fourth gear 53f are fixedly fitted on a shaft 53i. The shafts 53h and 53i extend parallel to the drive shaft of the motor 53a. As shown in FIG. 3, the outer edge of the final gear (fourth gear) 53f is exposed to the outside of the auxiliary drive unit 50 through the rectangular through hole 52b so that the final gear 53f is engaged with the pinion 42 of the focusing mechanism 40 when the auxiliary drive unit 50 is mounted on the housing mount 21.

At the time of mounting the auxiliary drive unit 50 on the housing mount 21, firstly, the drive unit mount 52 is brought into intimate contact with the housing mount 21 with the four through holes 52a being aligned with the corresponding four threaded holes 21a. Thereafter, the four set screws 44 are screwed into the four threaded holes 21a via the four through holes 52a, respectively, to fix the drive unit mount 52 to the housing mount 21. This makes the final gear 53f mesh with the pinion 42 of the focusing mechanism 40 as shown in FIGS. 4 and 5. In this state, if the motor 53 is driven to rotate the drive pinion 53b, the rotation of the motor 53 is transmitted to the rack 43 via the first through fourth gears 53c, 53d, 53e and 53f and the pinion 42 to thereby move the movable barrel 30 in the optical axis direction relative to the telescope main barrel 10. Accordingly, the focusing mechanism 40 having the rack 43 and the pinion 42 can provide a motor-driven focusing function if the auxiliary drive unit 50 is connected to the housing mount 21. Namely, the motor 53a is driven to move the movable barrel 30 in the optical axis direction to bring a distant object into focus by operating an operation switch (not shown) to turn ON and OFF the power of the motor 53a.

In a state shown in FIGS. 4 and 5 where the auxiliary drive unit 50 is mounted on the housing mount 21, the movable barrel 30 can be driven manually by operating either one of the left and right focus knobs 60. Accordingly, in a state shown in FIGS. 4 and 5, the motor-driven focusing operation and the manual focusing operation can be selectively performed without removing the auxiliary drive unit 50 from the housing mount 21 since the auxiliary mechanism (drive mechanism 53) is coupled to the focusing mechanism via a route different from a route of which the focus knob is coupled to the focusing mechanism.

Figure 6:
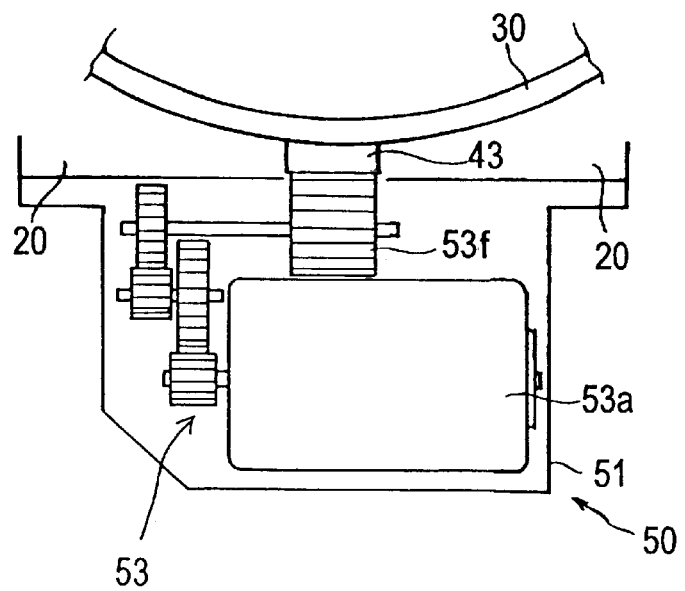
FIG. 6 is a view similar to that of FIG. 4 illustrating another embodiment of a focusing mechanism of the astronomical telescope.

In the illustrated embodiment described above, although the final gear 53f of the auxiliary drive unit 50 meshes with the pinion 42 of the focusing mechanism 40, the focusing mechanism 40 can be modified so that the final gear 53f of the auxiliary drive unit 50 directly meshes with the rack 43 without using any pinion disposed between the final gear 53f and the rack 43 as shown in FIG. 6.

Figure 7:
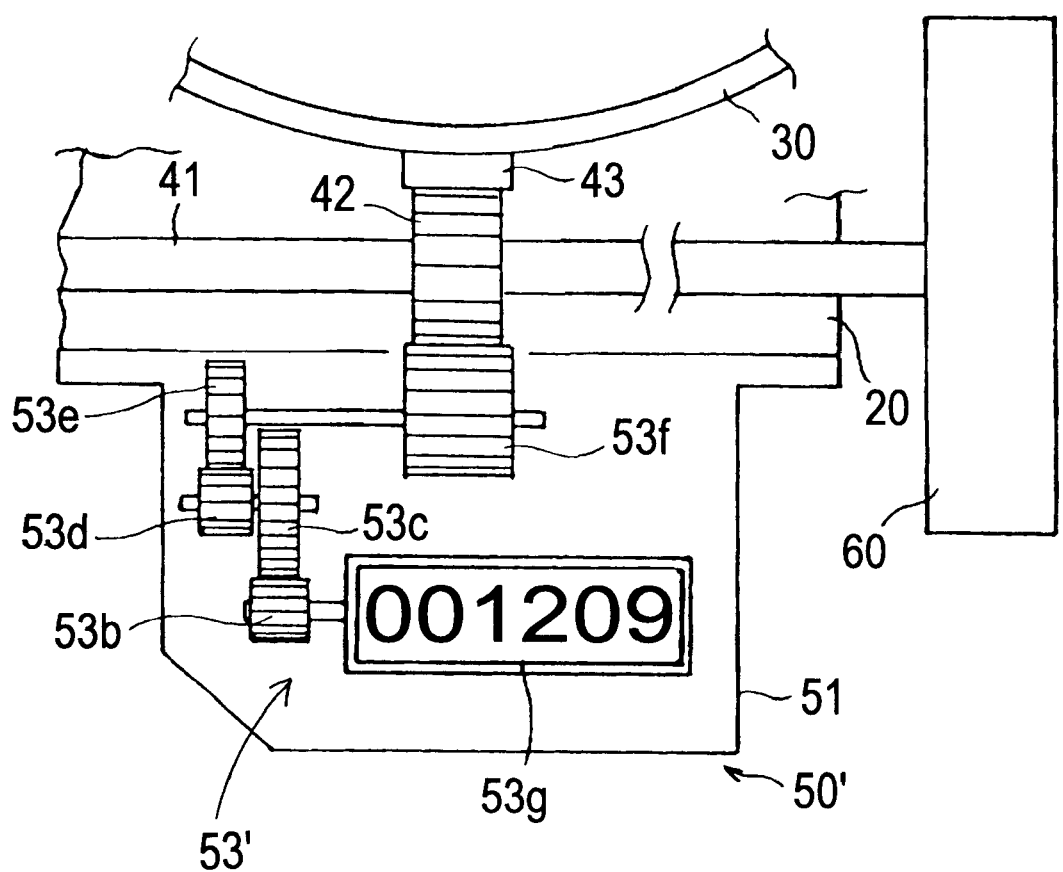
FIG. 7 is a view similar to that of FIG. 4 illustrating another embodiment of the auxiliary unit.

FIG. 7 shows another embodiment of the auxiliary unit which is mounted on the housing mount 21 of the astronomical telescope shown in FIG. 1. This auxiliary unit 50' is identical to the auxiliary drive unit 50 of the previous embodiment except that the motor 53a shown in FIG. 4 is replaced by a driven counter (driven device) 53g which is driven by drive force transmitted from the focusing mechanism 40. In this embodiment the driven counter 53g and the reduction gear train (53b through 53f) constitute a counter mechanism (auxiliary mechanism) 53'. If one of the left and right focus knobs 60 is operated, namely, if the movable barrel 30 is driven in the optical axis direction via the shaft 41, the pinion 42 and the rack 43, the driven counter 53g is driven at the same time via the shaft 41, the pinion 42, the reduction gear train (53b through 53f) and the driven pinion 53b. Therefore, since the movable barrel 30 and the driven counter 53g are synchronous, the axial position of the movable barrel 30 can be detected (recorded) by reading the number of the driven counter 53g.

According to each of the previous embodiments to which the present invention is applied, in order to make it possible to connect the auxiliary unit 50 or 50' to a conventional astronomical telescope, the astronomical telescope only needs a slight modification by forming a mount (which corresponds the housing mount 21) on a housing (which corresponds the fixed housing 20) of the astronomical telescope. This slight modification only requires a slight increase in the cost of production of the astronomical telescope.

According to each of the previous embodiments to which the present invention is applied, the astronomical telescope is designed so that only one auxiliary unit 50 or 50' can be connected to the fixed housing 20; however, it is possible to design the astronomical telescope so that the two auxiliary unit 50 and 50' can be connected to the fixed housing 20 at the same time.

In the illustrated embodiments, the auxiliary unit 50 or 50' is fixed to the housing mount 21 by set screws 44, so that the auxiliary unit 50 or 50' can be easily mounted on and removed from the housing mount 21 with a simple tool such as a screwdriver. However, the means for fixing (connecting) the auxiliary unit 50 or 50' to the housing mount 21 is not limited solely to such set screws. For instance, a bayonet coupling can be used as a connecting device, which makes the removability of the auxiliary unit easier.

In the illustrated embodiments, although the present invention is applied to astronomical telescope, the present invention can be applied to any other viewing optical instrument such as a spotting scope (monocular) or a microscope.

As can be understood from the foregoing, according to the present invention, in a viewing optical instrument such as an astronomical telescope which requires a manual focusing operation, a focusing device of the viewing optical instrument has been achieved wherein an auxiliary unit having, for example, a drive motor, can be connected to the astronomical telescope at a low cost of production, wherein the auxiliary unit can be easily removed.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A viewing optical instrument comprising:

a main barrel which supports an objective optical system;

a fixed housing fixed to the main barrel;

a movable member for focus adjustment which is supported by said main barrel to be movable along an optical axis of said objective optical system relative to said main barrel;

a focusing mechanism which drives said movable member along said optical axis;

a focus knob which actuates said focusing mechanism;

an auxiliary unit provided separately from said viewing optical instrument comprising an auxiliary mechanism which is associated with said focusing mechanism when said auxiliary unit is connected to said viewing optical instrument; and a connecting device for detachably attaching said auxiliary unit to said viewing optical instrument.

2. The viewing optical instrument according to claim 1, wherein when said auxiliary unit is connected to said viewing optical instrument, said auxiliary mechanism is coupled to said focusing mechanism via a route different from a route of which said focus knob is coupled to said focusing mechanism.

3. The viewing optical instrument according to claim 1, wherein said auxiliary mechanism comprises a motor for driving said focusing mechanism.

4. The viewing optical instrument according to claim 1, wherein said auxiliary mechanism comprises a driven device which is driven by an operation of said focus knob via said focusing mechanism to detect an axial position of said movable member.

5. The viewing optical instrument according to claim 4, wherein said driven device comprises a counter which indicates said axial position of said movable member.

6. The viewing optical instrument according to claim 1, wherein said viewing optical instrument further comprises:

a first mount, formed on said fixed housing, on which said auxiliary unit is mounted, said first mount having a first through hole through which part of said focusing mechanism is exposed to the outside of said viewing optical instrument.

7. The viewing optical instrument according to claim 6, further comprising a cover which is connected to said first mount when said auxiliary unit is not connected to said first mount.

8. The viewing optical instrument according to claim 6, wherein said auxiliary unit comprises:

a second mount which is mounted onto said first mount when said auxiliary unit is connected to said viewing optical instrument, said second mount having a second through hole through which part of said auxiliary mechanism is exposed to the outside of said auxiliary unit, said first through hole being aligned with and said second through hole when said auxiliary unit is mounted onto said first mount.

9. The viewing optical instrument according to claim 1, wherein said focusing mechanism comprises:

a rack fixed to said movable member, said rack extending parallel to said optical axis; and a first pinion which is rotatably supported to mesh with said rack;

wherein said first pinion is driven when said focus knob is operated.

10. The viewing optical instrument according to claim 9 wherein said auxiliary mechanism of said auxiliary unit comprises a second pinion which operatively engages said rack when said auxiliary unit is connected to said viewing optical instrument.

11. The viewing optical instrument according to claim 9, wherein said auxiliary mechanism of said auxiliary unit comprises a second pinion which operatively engages said first pinion when said auxiliary unit is connected to said viewing optical instrument.

12. The viewing optical instrument according to claim 9, wherein said viewing optical instrument comprises an astronomical telescope.

13. The viewing optical instrument according to claim 9, further comprising a shaft to which said first pinion is coaxially fixed, said focus knob being fixed to said shaft.

14. The viewing optical instrument according to claim 1, wherein said movable member is a movable barrel fitted in said main barrel to be movable along said optical axis of said objective optical system relative to said main barrel.

15. A telescope comprising:

a main tube and a drawtube which is drawn out of and inserted into said main tube to focus said telescope on an object which is to be viewed through said telescope, a fixed housing being fixed to said main tube;

a focusing mechanism for driving said drawtube relative to said main tube;

a focus knob which actuates said focusing mechanism;

an auxiliary unit provided separately from said telescope, said auxiliary unit comprising an auxiliary mechanism which is associated with said focusing mechanism when said auxiliary unit is connected to said telescope; and a connecting device for detachably attaching said auxiliary unit to said telescope.

* * * * *